(12) United States Patent  (10) Patent No.: US 9,368,139 B1
Sedklang et al.  (45) Date of Patent: Jun. 14, 2016

(54) SLIDER BACK SIDE ETCHING TO INCREASE SHEAR STRENGTH BETWEEN SUSPENSION AND SLIDER

(71) Applicant: Western Digital(Fremont), LLC, Fremont, CA (US)

(72) Inventors: Wanchai Sedklang, Pathumthani (TH); Anucha Suvibua, Pathumthani (TH)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/664,425

(22) Filed: Mar. 20, 2015

(51) Int. Cl.
*G11B 5/48* (2006.01)
*G11B 5/60* (2006.01)

(52) U.S. Cl.
CPC ............ *G11B 5/4826* (2013.01); *G11B 5/6082* (2013.01)

(58) Field of Classification Search
None
See application file for complete search history.

(56) References Cited

U.S. PATENT DOCUMENTS

| | | | |
|---|---|---|---|
| 5,223,997 A * | 6/1993 | Uemura et al. ....... | G11B 5/4826 360/234.6 |
| 5,675,454 A * | 10/1997 | Hatanai et al. ....... | G11B 5/4826 360/234.6 |
| 6,075,673 A | 6/2000 | Wilde et al. | |
| 6,097,575 A | 8/2000 | Trang et al. | |
| 6,108,170 A | 8/2000 | Crawforth et al. | |
| 6,125,014 A | 9/2000 | Riedlin, Jr. | |
| 6,125,015 A | 9/2000 | Carlson et al. | |
| 6,130,863 A | 10/2000 | Wang et al. | |
| 6,137,656 A | 10/2000 | Levi et al. | |
| 6,144,528 A | 11/2000 | Anaya-Dufresne et al. | |
| 6,147,838 A | 11/2000 | Chang et al. | |
| 6,151,196 A | 11/2000 | Carlson et al. | |
| 6,178,064 B1 | 1/2001 | Chang et al. | |
| 6,181,522 B1 | 1/2001 | Carlson | |
| 6,181,673 B1 | 1/2001 | Wilde et al. | |
| 6,229,672 B1 | 5/2001 | Lee et al. | |
| 6,236,543 B1 | 5/2001 | Han et al. | |
| 6,246,547 B1 | 6/2001 | Bozorgi et al. | |
| 6,249,404 B1 | 6/2001 | Doundakov et al. | |
| 6,282,063 B1 | 8/2001 | Coon | |
| 6,330,131 B1 | 12/2001 | Nepela et al. | |
| 6,339,518 B1 | 1/2002 | Chang et al. | |
| 6,349,017 B1 | 2/2002 | Schott | |
| 6,373,660 B1 | 4/2002 | Lam et al. | |
| 6,378,195 B1 | 4/2002 | Carlson | |
| 6,522,504 B1 | 2/2003 | Casey | |
| 6,538,850 B1 | 3/2003 | Hadian et al. | |
| 6,583,953 B1 | 6/2003 | Han et al. | |
| 6,646,832 B2 | 11/2003 | Anaya-Dufresne et al. | |
| 6,661,612 B1 | 12/2003 | Peng | |
| 6,665,146 B2 | 12/2003 | Hawwa et al. | |
| 6,690,545 B1 | 2/2004 | Chang et al. | |
| 6,704,173 B1 | 3/2004 | Lam et al. | |
| 6,708,389 B1 | 3/2004 | Carlson et al. | |
| 6,717,773 B2 | 4/2004 | Hawwa et al. | |

(Continued)

FOREIGN PATENT DOCUMENTS

| | | | |
|---|---|---|---|
| JP | 60253072 A | * | 12/1985 |
| JP | 03091173 A | * | 4/1991 |

(Continued)

*Primary Examiner* — Craig A. Renner (57) ABSTRACT

The present disclosure generally relates to a slider having a textured bonding surface. The slider may be used in a hard disk drive (HDD). The textured bonding surface permits the slider to be effectively bonded to a suspension and prevent the slider from debonding from the suspension due to shear forces that may occur during HDD operation.

20 Claims, 7 Drawing Sheets

(56) References Cited

U.S. PATENT DOCUMENTS

| | | | |
|---|---|---|---|
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,729,089 B1 | 6/2010 | Hogan |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 2013/0244541 A1 | 9/2013 | Yaemglin et al. |
| 2013/0293982 A1 | 11/2013 | Huber |

FOREIGN PATENT DOCUMENTS

| | | | |
|---|---|---|---|
| JP | 04305877 A | * | 10/1992 |
| JP | 05028686 A | * | 2/1993 |
| JP | 05144207 A | * | 6/1993 |

* cited by examiner

SLIDER BACK SIDE ETCHING TO INCREASE SHEAR STRENGTH BETWEEN SUSPENSION AND SLIDER

BACKGROUND

1. Field of the Disclosure

Embodiments of the present disclosure generally relate to a slider for use in a hard disk drive (HDD).

2. Description of the Related Art

In HDDs, a magnetic head is disposed over a magnetic media. The magnetic head reads from, and writes data to, the magnetic media. The magnetic head has a surface, referred to as an air bearing surface (ABS), facing the magnetic media. As the magnetic media moves, air exerts a pressure on the ABS and pushes the magnetic head away from the magnetic media. The magnetic head is formed on a slider, which is coupled to a suspension. The suspension exerts a counter force that, when considered in concert with the moving media, ensures the magnetic head is disposed a predetermined distance from the magnetic media during operation.

The slider and the suspension are fabricated separately and then assembled by bonding the slider to the suspension. During operation, when the media moves, the slider is exposed to shear forces that may cause the slider to detach from the suspension.

Therefore, there is a need in the art for a slider that is capable of remaining attached to the suspension during operation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. It is to be understood that all drawings are not to scale.

DETAILED DESCRIPTION

The present disclosure generally relates to a slider having a textured bonding surface. The slider may be used in a hard disk drive (HDD). The textured bonding surface permits the slider to be effectively bonded to a suspension and prevent the slider from debonding from the suspension due to shear forces that may occur during HDD operation.

Figure 1:
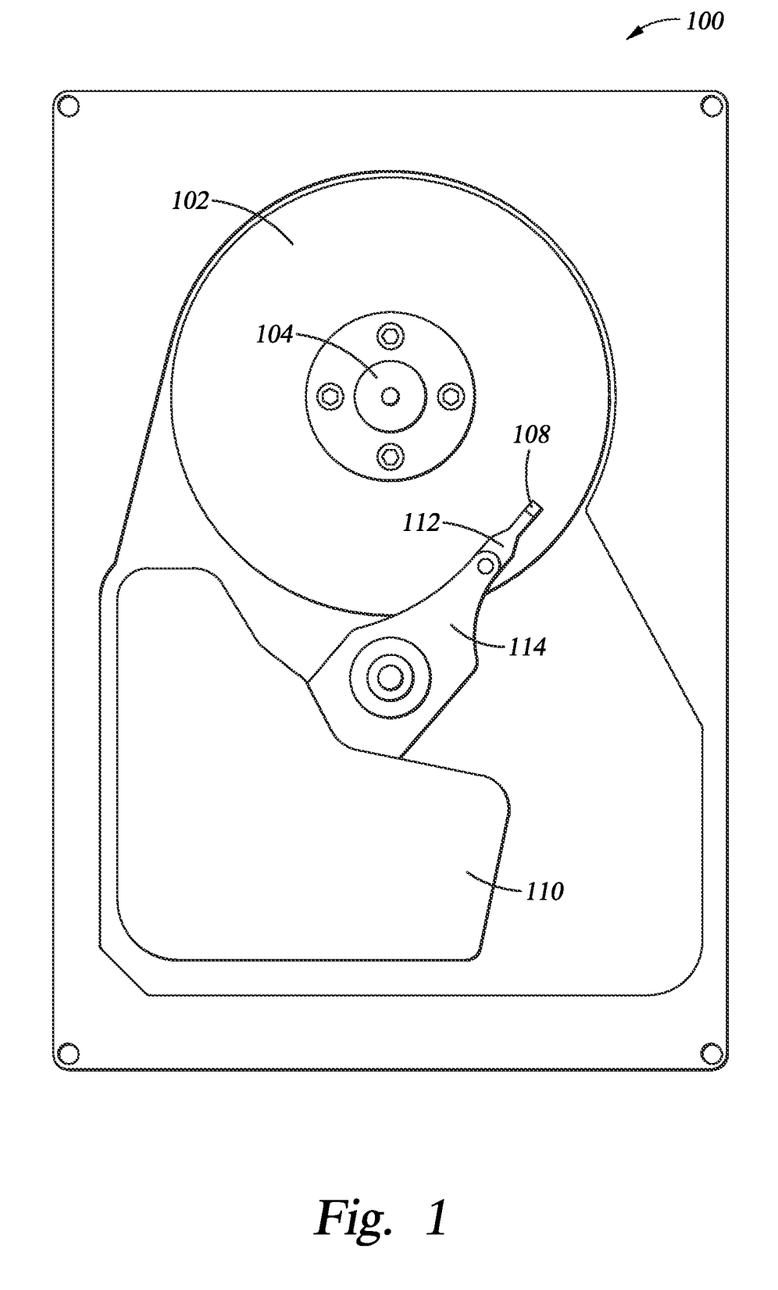
FIG. 1 is a schematic illustration of a HDD according to one embodiment.

FIG. 1 is a schematic illustration of a magnetic recording device, such as a hard disk drive (HDD) 100 according to one embodiment. The HDD 100 includes at least one magnetic recording medium, such as a disk 102 that is supported on a spindle 104. A motor causes the spindle 104, and hence the disk 102, to rotate. A magnetic head that is mounted on a slider 108 moves over the disk 102 to read and write information from/to the disk 102. The head rides on an air bearing above the disk 102 during read/write operations. The slider 108 is coupled to an actuator 110 by a suspension 112 and arm 114. The suspension 112, which may comprise stainless steel, provides a slight spring force, which biases the slider 108 towards the disk surface. Each actuator 110 is attached to an actuator means that controls the movement of the head 106 relative to the disk 102.

Figure 2A:
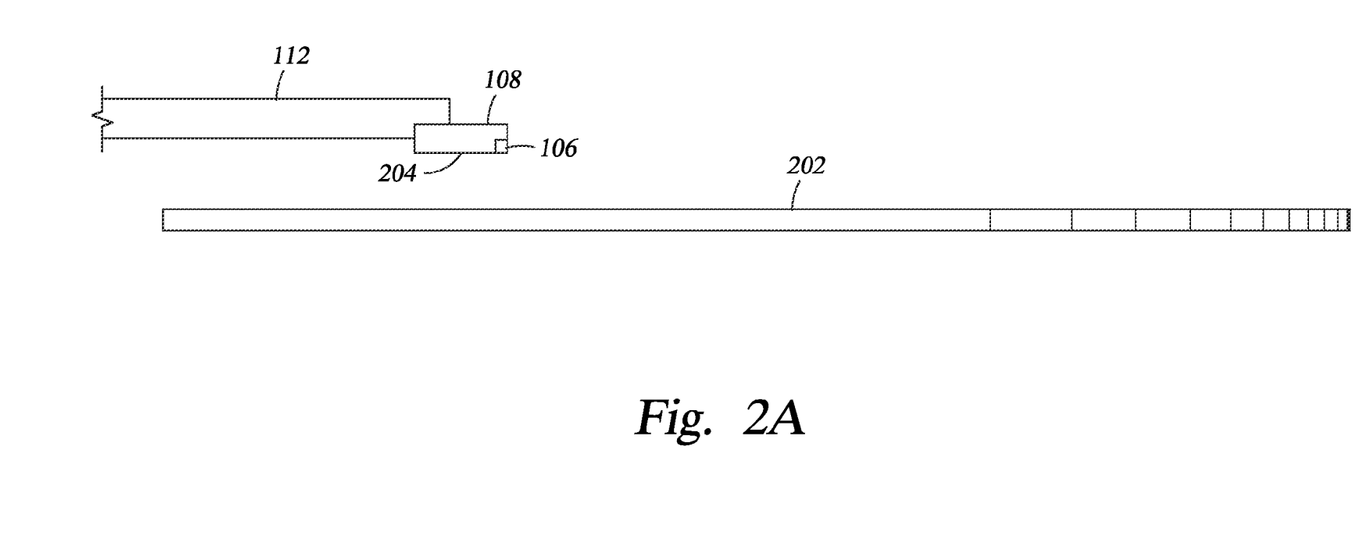
FIG. 2A is a schematic illustration of a slider coupled to a suspension disposed over a magnetic media according to one embodiment.

FIG. 2A is a schematic illustration of a slider 108 having a head 106 coupled to a suspension 112 disposed over a magnetic media 202 according to one embodiment. The slider 108 has an ABS 204 facing the magnetic media 202.

Figure 2B:
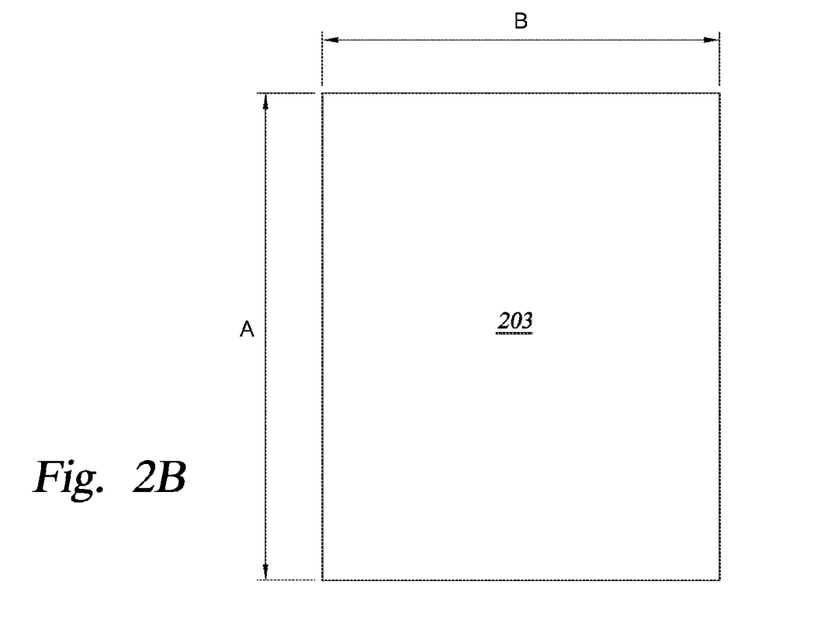
FIG. 2B is a schematic illustration of a slider bonding surface prior to texturing.

FIG. 2B is a schematic illustration of a suspension bonding surface 203. The suspension 112 has a length shown by arrows "A" and a width shown by arrows "B". The surface area of the suspension bonding surface 203 is equal to AxB which may be up to about 0.6 mm$^2$. Prior to texturing, the slider bonding surface 206 may have the same surface area as the suspension bonding surface 203. After texturing, however, the slider bonding surface 206 surface area will be greater than the suspension bonding surface 203 surface area.

Figure 2C:
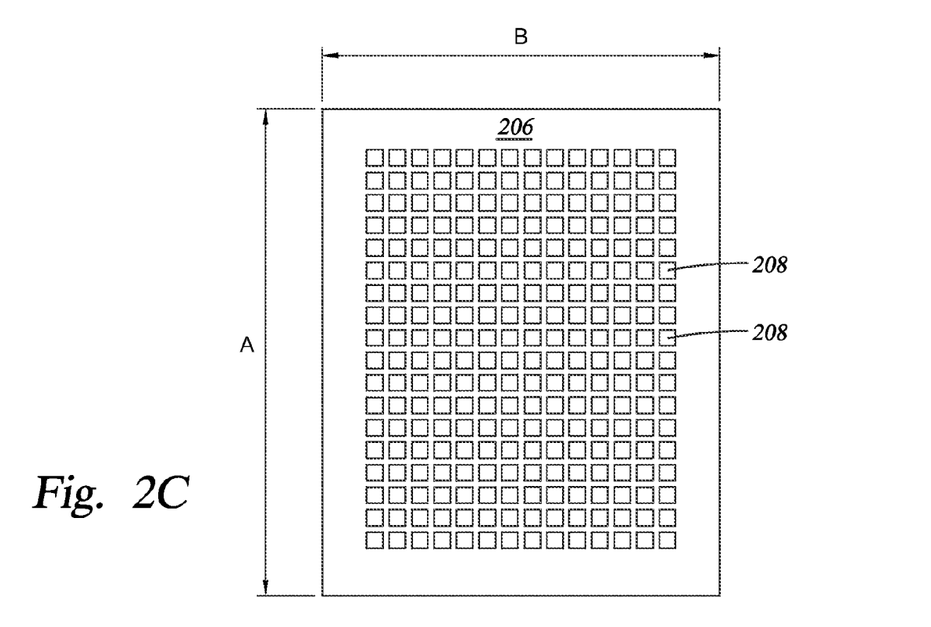
FIG. 2C is a schematic illustration of a slider bonding surface after texturing according to one embodiment.

FIG. 2C is a schematic illustration of a slider bonding surface 206 after texturing according to one embodiment. After texturing, features 208 have been formed into the slider bonding surface 206. The features 208 are formed a depth into the slider bonding surface 206 and as such, the total surface are of the slider bonding surface is increased as compared to the slider bonding surface 206 prior to texturing. The surface area after texturing may be greater than about 0.6 mm$^2$. In one embodiment, the surface area may be between about 0.62 mm$^2$ and about 0.85 mm$^2$, such as between about 0.65 mm$^2$ and about 0.72 mm$^2$, and between about 0.67 mm$^2$ and about 0.69 mm$^2$. The features 208, which may be referred to as slots, may be formed to a depth of greater than about 0.001 mm, such as between about 0.002 mm and about 0.010 mm, such as between about 0.003 mm and about 0.005 mm, such as 0.004 mm.

Figure 3A:
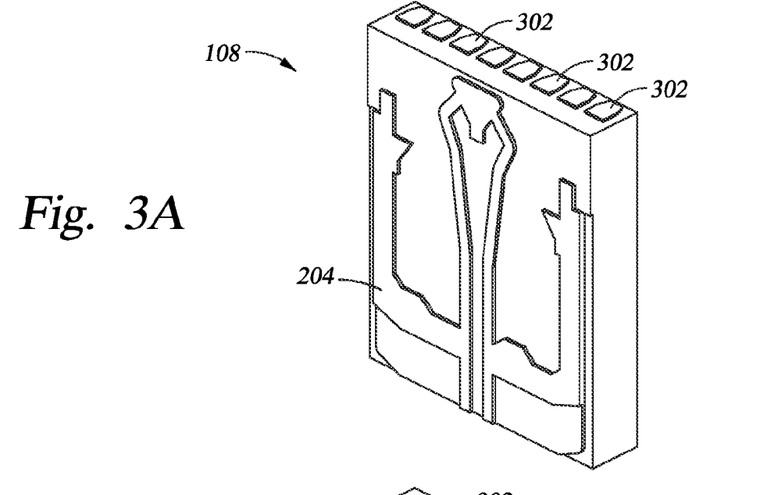
FIG. 3A is an isometric illustration of a slider.
Figure 3B:
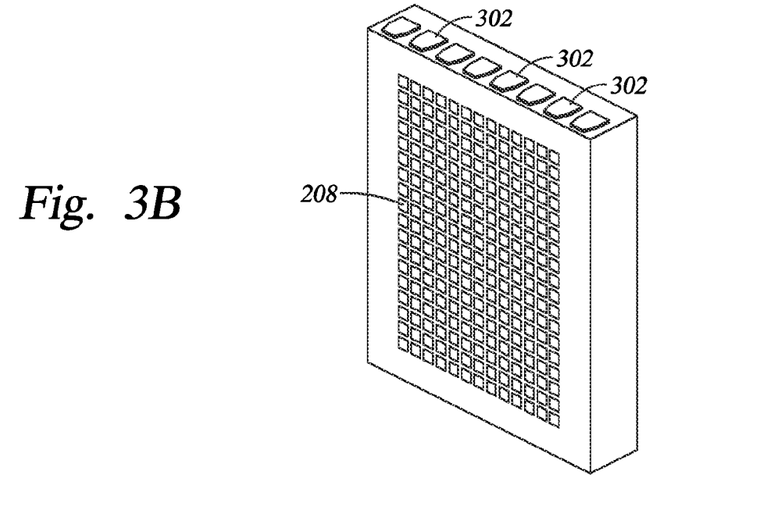
FIG. 3B is an isometric illustration of the slider of FIG. 3A when viewed from the bonding surface.

FIG. 3A is an isometric illustration of a slider 108. The slider 108 has the ABS 204. Electrical contact points 302 are shown as well. The electrical contact points 302 are used to connect the slider 108 to the controller for the HDD, such as a voice coil motor. FIG. 3B is an isometric illustration of the slider 108 of FIG. 3A when viewed from the bonding surface 206. The features 208 are shown in FIG. 3B and can be seen as indented into the bonding surface 206. In the embodiment shown in FIG. 3B, the features 208 are disposed in a central region of the slider bonding surface 206 and do not extend all the way to the edge of the slider bonding surface 206. It is to be understood that the features 208 may be disposed over the entire slider bonding surface 206. Additionally, it is to be understood that the features 208 may be disposed into the slider bonding surface 206 at a location other than the central area of the slider bonding surface 206. The feature 208 location shown in FIG. 3B is not to be limited, but rather, simply an example of one possibility.

Figure 3C:
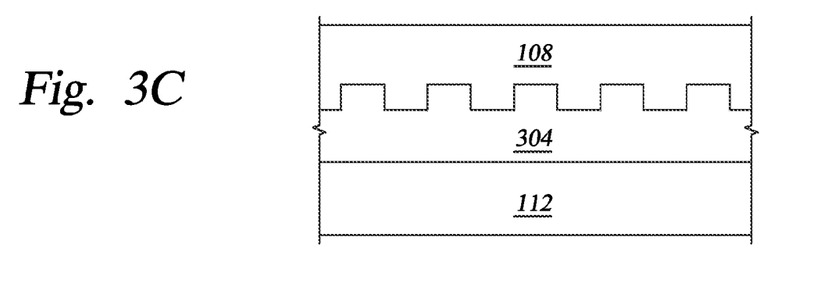
FIG. 3C is a cross sectional illustration of a slider coupled to a suspension according to one embodiment.

FIG. 3C is a cross sectional illustration of a slider 108 coupled to a suspension 112 according to one embodiment. An adhesive material 304 is used between the slider 108 and the suspension 112. In one embodiment, the adhesive material 304 may comprise an epoxy that may be cured by UV radiation or annealing in an oven. As shown in the cross-sectional illustration, the textured surface of the bonding surface increases the surface area (as compared to a non-textured surface) and thus increases the area upon which the adhesive material is present. Hence, the textured bonding surface 206, due to the increased surface area, is more difficult to separate from the suspension during operation and can therefore withstand a greater shear force.

Figure 3D:
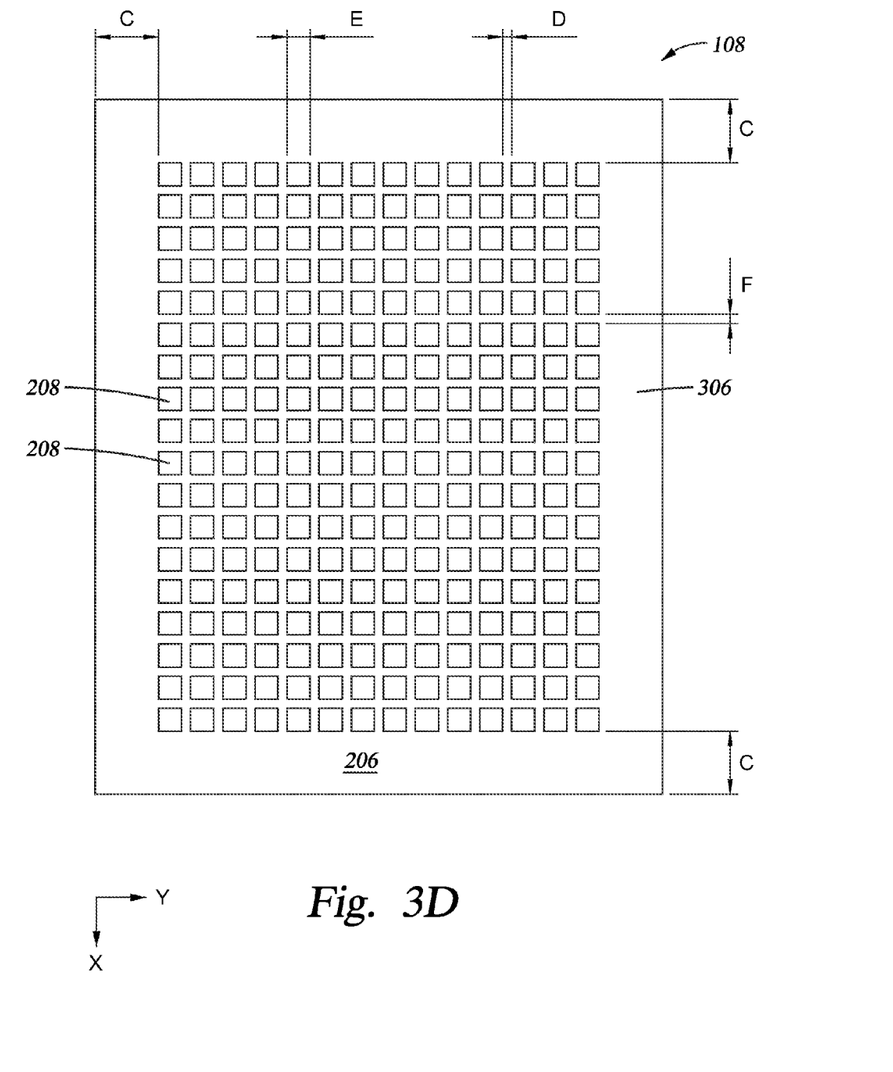
FIG. 3D is a schematic illustration of a bonding surface of a slider according to one embodiment.

FIG. 3D is a schematic illustration of a bonding surface 206 of a slider 108 according to one embodiment. The texture features 208 are separated from the edge of the slider 108 by an edge area 306 by a distance shown by arrows "C" which may be between about 0.065 mm and about 0.075 mm. As such, the textured area is in a middle area of the slider body. In one embodiment, the features 208 may be spaced apart by a distance shown by arrows "D" and be between about 0.010 mm and about 0.020 mm. The features themselves may have a width and length shown by arrows "E" of between about 0.020 mm and about 0.030 mm. The pitch between features may be shown by arrows "F" and be between about 0.030 mm and about 0.050 mm. It is to be understood that while the features 208 have been shown as squares, other shapes are contemplated as well such as circles, sphere, diamonds, or combinations thereof.

Figure 4:
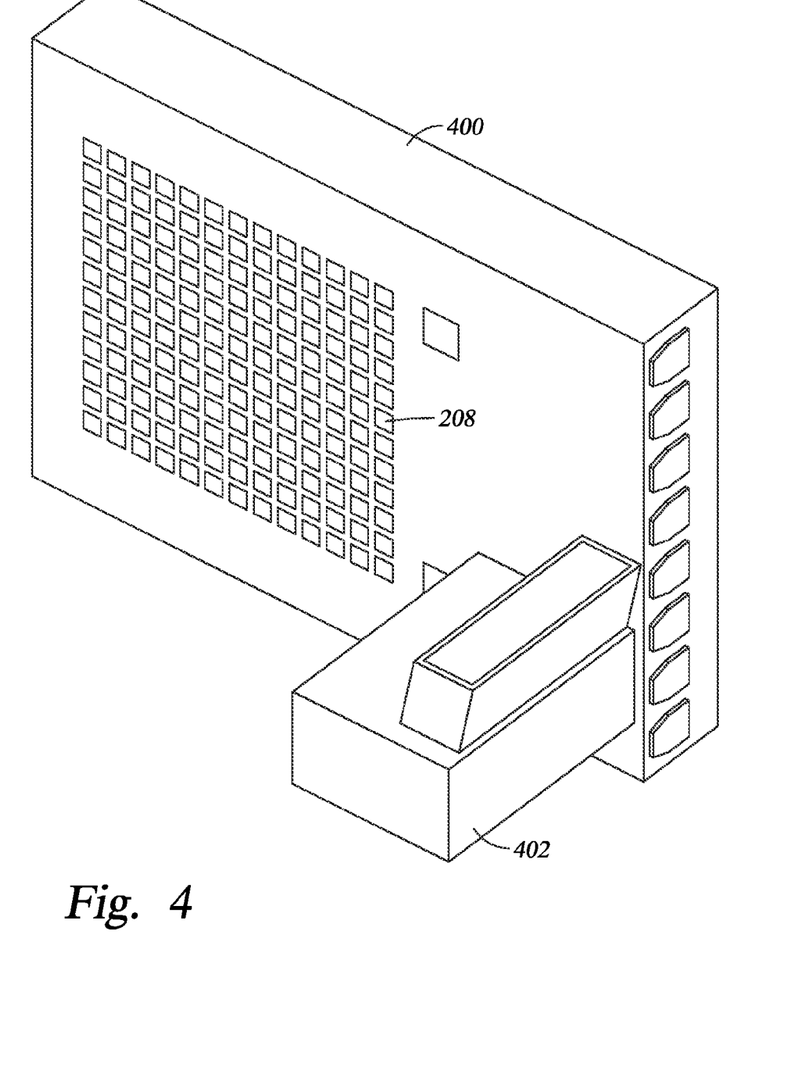
FIG. 4 is an isometric illustration of a HAMR slider with submount according to one embodiment.

FIG. 4 is an isometric illustration of a HAMR slider 400 with submount 402 according to one embodiment. A textured slider bonding surface is not limited to perpendicular magnetic recording, but rather, is applicable to any magnetic recording technique. For example, the texturing may be used for a HAMR slider 400 as shown in FIG. 4. As shown in FIG. 4, rather than texturing the entire bonding surface, only a selected portion of the slider is textured while a remainder of the slider 400 is intended to extend beyond the suspension so that the submount 402 may have room for mounting.

Figure 5:
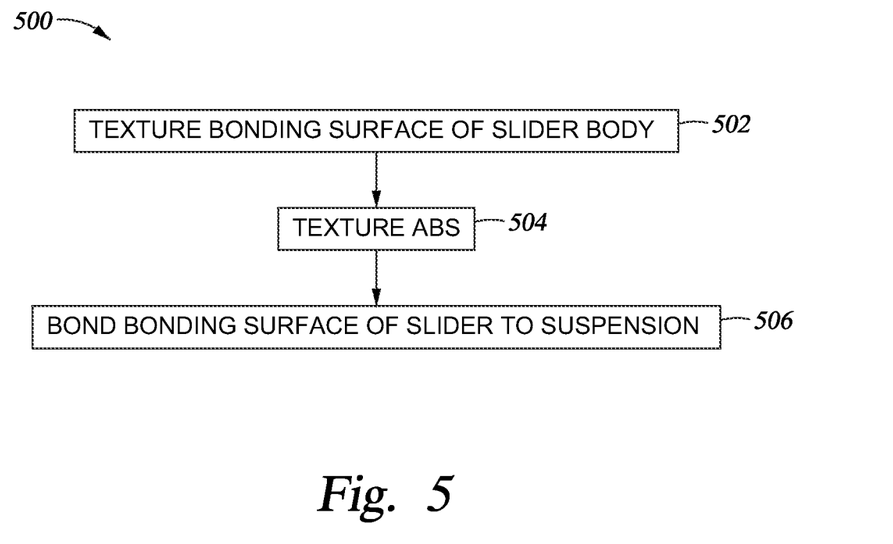
FIG. 5 is a flow chart illustrating the method of producing the textured slider bonding surface.

FIG. 5 is a flow chart 500 illustrating the method of producing a HDD. Initially, the bonding surface 206 of the slider 108 is textured (502) by way of conventional methods such as etching using a plasma or a wet etching process. Thereafter, the ABS is formed by a texturing process (504). Finally, the slider is bonded to the suspension (506).

The benefit of using a textured slider bonding surface include an increase in surface area of the slider bonding surface such that the shear stress required to debond the slider from a suspension is increased compared to a non-textured slider bonding surface. The goal of the texturing is to create as large a surface area as possible for bonding to ensure the shear stress needed to debond the slider from the suspension is greater than the shear stress that occurs during normal device operation. It is to be understood that the texturing described herein is applicable to all types of sliders utilized in magnetic recording.

While the foregoing is directed to embodiments of the present disclosure, other and further embodiments of the disclosure may be devised without departing from the basic scope thereof, and the scope thereof is determined by the claims that follow.

The invention claimed is:

1. A slider for a magnetic recording device, comprising:
a slider body having an air bearing surface for facing a magnetic recording medium in the magnetic recording device, the slider body also having a bonding surface opposite the air bearing surface, wherein the bonding surface has edges and a middle area, wherein the middle area is textured with features, wherein the middle area is spaced from all edges of the bonding surface, and wherein the middle area is spaced between about 0.065 mm to about 0.075 mm from the edges of the bonding surface, and an edge area between the middle area and the edges is untextured.

2. The slider of claim 1, wherein the bonding surface has a surface area of greater than 0.6 mm$^2$.

3. The slider of claim 2, wherein the features have a width and a length, and wherein each of the width and the length of the features is between about 0.020 mm and about 0.030 mm.

4. The slider of claim 2, wherein the features extend to a depth of greater than 0.001 mm into the slider body.

5. The slider of claim 4, wherein the features are spaced apart by a distance of between 0.010 mm and 0.020 mm.

6. The slider of claim 5, wherein the features have a width and a length, and wherein each of the width and the length of the features is between about 0.020 mm and about 0.030 mm.

7. The slider of claim 1, wherein the features have a width and a length, and wherein the width and the length of the features is between about 0.020 mm and about 0.030 mm.

8. The slider of claim 1, wherein the features extend to a depth of greater than 0.001 mm into the slider body.

9. The slider of claim 8, wherein the features are spaced apart by a distance of between 0.010 mm and 0.020 mm.

10. A magnetic recording device, comprising:
a magnetic recording medium;
a slider having a magnetic recording head; and
a suspension coupled to the slider and capable of moving the magnetic recording head over the magnetic recording medium,
wherein the slider includes a slider body having an air bearing surface facing the magnetic recording medium, the slider body also having a bonding surface opposite the air bearing surface, wherein the bonding surface is bonded to the suspension, wherein the bonding surface has edges and a middle area, wherein the middle area is textured with features, wherein the middle area is spaced from all edges of the bonding surface, and wherein the middle area is spaced between about 0.065 mm to about 0.075 mm from the edges of the bonding surface, and an edge area between the middle area and the edges is untextured.

11. The magnetic recording device of claim 10, wherein the suspension comprises stainless steel.

12. The magnetic recording device of claim 11, wherein the bonding surface has a surface area of greater than 0.6 mm$^2$.

13. The magnetic recording device of claim 11, wherein the suspension includes a first surface bonded to the bonding surface, wherein the first surface has a first surface area and the bonding surface has a second surface area and wherein the second surface area is greater than the first surface area.

14. The magnetic recording device of claim 13, wherein the second surface area is greater than 0.6 mm$^2$.

15. The magnetic recording device of claim 10, wherein the suspension includes a first surface bonded to the bonding surface, wherein the first surface has a first surface area and the bonding surface has a second surface area and wherein the second surface area is greater than the first surface area.

16. The magnetic recording device of claim 10, wherein the bonding surface has a surface area of greater than 0.6 mm².

17. The magnetic recording device of claim 10, wherein the magnetic recording device is a heat assisted magnetic recording device.

18. The magnetic recording device of claim 10, wherein the features have a width and a length, and wherein each of the width and the length of the features is between about 0.020 mm and about 0.030 mm.

19. The magnetic recording device of claim 10, wherein the features extend to a depth of greater than 0.001 mm into the slider body.

20. The magnetic recording device of claim 19, wherein the features are spaced apart by a distance of between 0.010 mm and 0.020 mm.

\* \* \* \* \*